(12) United States Patent
Beauregard et al.

(10) Patent No.: US 8,700,665 B2
(45) Date of Patent: Apr. 15, 2014

(54) INTELLIGENT CONFERENCE CALL INFORMATION AGENTS

(75) Inventors: Derek Beauregard, Denver, CO (US); Vivek Bhatnager, Federal Heights, CO (US); Roger Toennis, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 672 days.

(21) Appl. No.: 12/430,741

(22) Filed: Apr. 27, 2009

(65) Prior Publication Data

US 2010/0274796 A1   Oct. 28, 2010

(51) Int. Cl.
*G06F 17/30* (2006.01)

(52) U.S. Cl.
USPC ............ 707/791; 707/802; 707/822; 707/828

(58) Field of Classification Search
USPC .................................................. 707/600–899
See application file for complete search history.

(56) References Cited

U.S. PATENT DOCUMENTS

| | | | |
|---|---|---|---|
| 4,611,095 A | 9/1986 | LeBlanc et al. | |
| 4,945,534 A | 7/1990 | Driscoll et al. | |
| 5,436,896 A | 7/1995 | Anderson et al. | |
| 5,987,503 A | 11/1999 | Murakami | |
| 2003/0185369 A1 | 10/2003 | Oliver et al. | |
| 2005/0033582 A1 | 2/2005 | Gadd et al. | |
| 2006/0206336 A1 | 9/2006 | Gurram et al. | |
| 2007/0206759 A1 | 9/2007 | Boyanovsky | |
| 2008/0034040 A1* | 2/2008 | Wherry et al. | 709/204 |
| 2008/0201434 A1* | 8/2008 | Holmes et al. | 709/206 |
| 2009/0097634 A1* | 4/2009 | Nambiar et al. | 379/265.09 |
| 2009/0129565 A1* | 5/2009 | Hyndman et al. | 379/87 |
| 2009/0319504 A1* | 12/2009 | Alberth et al. | 707/5 |
| 2010/0169418 A1* | 7/2010 | Whynot et al. | 709/204 |
| 2010/0180217 A1* | 7/2010 | Li | 715/758 |
| 2010/0217646 A1* | 8/2010 | Siegel | 705/9 |
| 2011/0077947 A1 | 3/2011 | Beauregard et al. | |

FOREIGN PATENT DOCUMENTS

| | | |
|---|---|---|
| EP | 1414227 | 4/2004 |
| JP | H04-314249 | 11/1992 |
| JP | H11-203295 | 7/1999 |

OTHER PUBLICATIONS

Official Action for U.S. Appl. No. 12/571,206, mailed Dec. 7, 2012 25 pages.
Extended Search Report for European Patent Application No. 10158289.8, dated Mar. 15, 2013 6 pages.
Official Action for U.S. Appl. No. 12/571,206, mailed Apr. 24, 2013 27 pages.
Official Action with English Translation for Japan Patent Application No. 2010-074082, mailed Nov. 12, 2013 5 pages.

* cited by examiner

*Primary Examiner* — Isaac M Woo
(74) *Attorney, Agent, or Firm* — Sheridan Ross P.C.

(57) ABSTRACT

A system is disclosed that integrates with conferencing platforms and provides real-time information by having intelligent agents running on a networked server that is integrated with the conferencing platform. The intelligent agents may be customized or adapted "on the fly" or be preprogrammed by a user or caller to examine real-time data feeds or actively search websites and other information sources. The agents then report any relevant information or content to the system for injection or broadcast into the conference.

20 Claims, 5 Drawing Sheets

INTELLIGENT CONFERENCE CALL INFORMATION AGENTS

FIELD OF THE INVENTION

The application relates generally to telecommunications and specifically to conference call technologies.

BACKGROUND

As participants on a multi-person conference call discuss a topic of interest, the participants often encounter information deficit problems that may be characterized as: (1) the breaking news problem and (2) the missing expertise problem. The breaking news problem involves a lack of awareness of events occurring in real-time that may be of particular relevance to the discussion topic. The missing expertise problem involves the discovery of a sudden lack of expertise required to perpetuate the productivity of the discussion. The lack of expertise may include the need for a subject matter expert or additional information or data.

These problems may result in a much less productive conference call and significant losses to an organization's potential productivity in total time lost. Additionally, these problems may sometimes be destructive to the progress and effectiveness of a business team by creating more problems than they solve, as participants may be acting on information that may be out-of-date or acting on potentially erroneous assumptions.

The present practice for producing timely and accurate information relevant to a conference call in progress relies on the participants in the call either to manually seek out real-time news sources for relevant information or to receive email or voice alerts. In either event, the participants manually interject relevant information into the conference call in an ad hoc manner. The present practice thus relies on the diligence of the participants and requires manual interruption of a conference call.

These and other problems are addressed in certain embodiments of the present disclosure.

SUMMARY

These and other needs are addressed by the present invention. The present invention is generally directed to information collecting agents and the active or passive participation of the agents in conference communications.

In a first embodiment, a method is provided that includes the steps of:

(a) connecting a live communication between first and second participants;

(b) during the live communication, searching, by a processor, a collection of information for selected information, the selected information being relevant to the content of the live communication; and (c) in response to locating selected information, providing, by a processor and during the live communication, the located selected information to one or more of the first and second participants.

In a second embodiment, a conferencing system includes:

(a) a conference bridge to conference together first and second participants; and (b) an agent operable, during the conference call, to search a collection of information for selected information, the selected information being relevant to the content of the conference call and, in response to locating selected information, provide the located selected information to one or more of the first and second participants.

In a third embodiment, a method includes the steps of:

(a) transmitting by a conference bridge a first audio output stream from a first participant communication device to a second participant communication device and a second audio output stream from the second participant communication device to the first participant communication device;

(b) identifying, by an information agent, a first keyword in one or more of the first and second audio output streams;

(c) searching, by the information agent, a syndicated feed (such as from an Internet aggregator) for the first keyword to provide selected information; and (d) providing, while the conference call is connected, the selected information to one or more of the first and second participant communication devices.

The agent, in one configuration, is a real-time information-bot that collects information, such as "breaking news" simultaneous with the communication or conference call. There may be multiple agents connected, at the same time, to the voice communication. The agents commonly run on a networked server that is integrated with the conferencing system via a conference server application programming interface.

The embodiments can have advantages over the prior art. By way of example, the embodiments can locate relevant, timely information, such as "breaking news", without manual searches needing to be done by conference call participants. The participants are therefore able to pay greater attention to the actual discussion, thereby increasing the productivity of the discussion and of the project team.

The Summary is neither intended nor should it be construed as being representative of the full extent and scope of the present invention. The present invention is set forth in various levels of detail in the Summary as well as in the attached drawings and the Detailed Description and no limitation as to the scope of the present invention is intended by either the inclusion or non-inclusion of elements, components, etc. in this Summary. Additional aspects of the present invention will become more readily apparent from the Detail Description, particularly when taken together with the drawings.

The accompanying drawings, which are incorporated in and constitute a part of the specification, illustrate embodiments of the invention and together with the general description of the invention given above and the detailed description of the drawings given below, serve to explain the principles of these inventions.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

A system and method for intelligent conference call information agents is described herein. Such a system and method may be implemented in a wide range of embodiments. While the present disclosure provides several embodiments of the present disclosure, individuals skilled in the art will understand that the embodiments described herein are not intended to limit the disclosure to only these embodiments. The present disclosure is intended to cover alternatives, modifications and equivalents that may be included within the spirit and scope of the disclosure as defined by the claims below.

Figure 1:
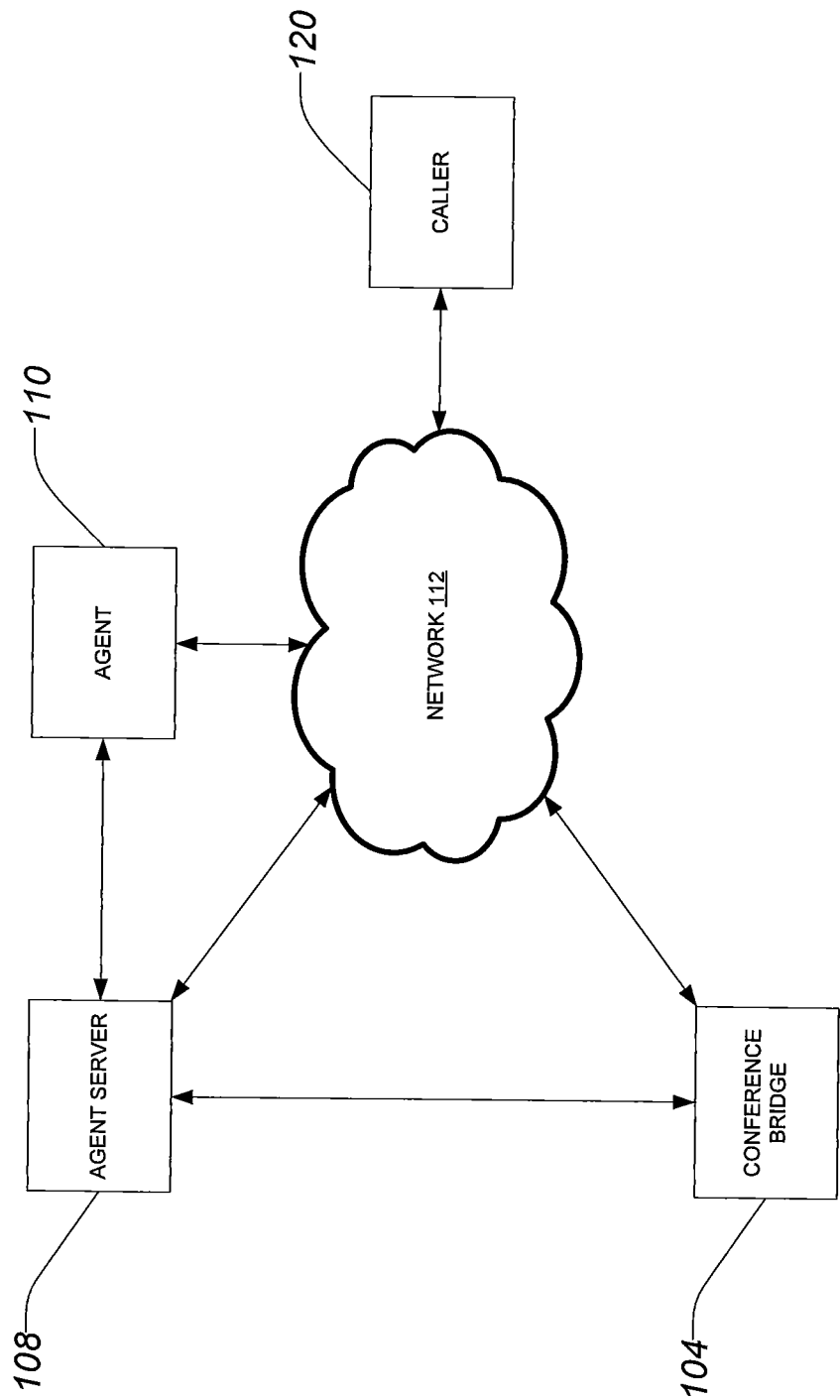
FIG. 1 shows a general network topology of one embodiment of the present disclosure.

FIG. 1 shows a block diagram of a conference call system with components and interconnections that may exist in one embodiment of the present disclosure. A conference bridge 104 is shown as being connected to an agent server 108 and a network 112. As one having skill in the art will appreciate, a conference bridge 104 is a system or device that enables interconnection of a plurality of communication devices in a conference connection. A conference bridge 104 is well known in the art, and may comprise a dedicated telephony conference device or a general purpose computer. The following U.S. patent Publications are generally directed to conference bridges, and are hereby incorporated by reference in their entireties: U.S. Pat. No. 4,611,095 to LeBlanc et al., U.S. Pat. No. 4,945,534 to Driscoll et al., U.S. Pat. No. 5,436,896 to Anderson et al. and U.S. Patent Publication 2003/0185369 to Oliver et al. Particularly preferred conference bridges are modified versions of IP Office™, Spectel 700™, System 70™, Quick Edition™, Partner™, Definity™, Communication Manager™, Magix™, Merlin Legend™ and Meeting Exchange™, all manufactured by Avaya, Inc.

The network 112 is a computer network that interchanges data by packet switching and/or circuit switching. The network 112 may be comprised of multiple devices that are in communication with each other, and may include, for example, a hub, a router, an ATM gateway, a switch and a repeater. The network 112 may be, for example, a LAN, a WAN, the Internet and a wireless network. The network 112 may also comprise a public switched telephone network (PSTN), which is a communication network that interchanges data by circuit switching. As one having skill in the art will appreciate, a PSTN may comprise a plurality of central office switching systems, an interoffice signaling network and at least one service control point database coupled to the interoffice signaling network.

Caller 120 represents a participant in the conference call. In this particular embodiment, caller 120 is in communication with the conference bridge 104 via the network 112. As such, caller 120 includes packet-based and circuit based communication device including, for example, a cellular phone, a computer, an internet protocol (IP) telephone and a conventional touch tone telephone. As used herein, caller 120 is intended to include one participant or a plurality of participants. One having ordinary skill in the art will appreciate that a conference call preferably includes a plurality of participants or collaborators.

The agent server 108 is a device that integrates with the conference bridge 104, and manages agent 110 by coordinating or marshaling information and communication between the agent 110 and the conference bridge 104. In one embodiment of the present disclosure, the agent 110 is a process residing on agent server 108. In another embodiment, the agent 110 is a process or dedicated device residing outside, but in communication with, the agent server 108. The agent server 108 may coordinate information or data received from the agent 110 by prioritizing it and introducing it into the conversation according to specific rules. By way of example, in one embodiment of the present disclosure, data that is critical to a conference call may be given high priority, and the agent server 108 may, in these cases, be permitted to intrude into the conversation and announce or broadcast the information. The intrusion may be through one or multiple endpoints to the conference call.

It is another aspect of the present disclosure that the agent 110 plays a passive role in the conversation, whereby the agent 110 monitors or receives voice data in the conversation and records the received data into a database. The communicated data may be raw voice data; it may be data that has been analyzed and converted into text; it may be both raw data and converted text; or it may include other types of enhanced data including, for example, whiteboard sketches, presentation and video conference data.

It is one aspect of the present disclosure that the agent 110 is a process that searches and/or listens for information or news according to certain conditions, rules or parameters. The information may be particularly relevant to all participants of a conference call, or it may be of specific interest to only a subset of participants or a single participant to the conference call. The certain conditions rules or parameters may be implemented as a generic information access and delivery template (e.g., a web search engine) that could be customized by each user and use, for example, Boolean operators, or column and field-based queries. Depending on the needs of each user, the agent could be customized to select and filter real-time data feeds (e.g., syndicated feeds such as Internet aggregator) including, for example, really simple syndication (RSS) and Atom, and other feeds such as Internet radio, Video News websites, Youtube, news websites, enterprise resource planning software or customer relationship management software, such as SAP R/3™ or SAP ERP™ produced by SAP, Siebel CRM™ produced by Oracle, Human Resource or HR systems, and the like. For example, the agent can be pre-programmed to look and listen for specific types of current events keywords on one or more information feeds. The agent can find information relevant to the conference call discussion in near real time and notify one or more of the conference call participants, which is generally the host, that breaking news is available for review with optional, immediate insertion of the news into the bridge 104. One having ordinary skill in the art will appreciate that there are a wide variety of methods and combinations by which the agent 110 may obtain real-time data. It will be further appreciated that the source of a data feed may exist on the Internet or on a proprietary or private system within an enterprise network (e.g., enterprise knowledge base, database, contact directory, user mailbox, enterprise directory), which may be particularly useful when searching for information collected in a previous or concurrently held conference call. The agent 110 may draw upon text, audio, video or other machine-readable data formats. With most information sources now using keyword tagging techniques, it is possible to construct or program an agent 110 to search for and sort relevant information based on keywords as soon as the information becomes available. As a "live" participant on the conference bridge 104, each agent can, under full control by the conference host, deliver the relevant real-time information, or breaking news, that the host determines is relevant to a currently active conference call. In another embodiment of the present disclosure, the agent 110 may be activated or programmed by a caller or other participant during a conference call that is already in progress. In this embodiment, agents 110 may be programmed in real-time by a host or participant caller 120 to search for selected topics (e.g., topics "X", "Y", and "Z") as the topics develop or the need for certain information arises during a conference call. In this embodiment, for example, a host or participant caller 120 may selectively engage an agent 110 (e.g., by vocal command, DTMF or web interface) and instruct the agent 110 to search for certain information. It is one aspect of this and other embodiments that an agent 110 is used to find contact information for people or subject matter experts. As noted above, the agent 110 may gather contact information from a plurality of sources and convey the information on the conference bridge 104. Searching for selected topics as they are revealed during the conversation to be important is preferable in many applications to searching using only pre-selected topics that were believed to be important before the conversation began. This embodiment is preferred for ad hoc conference calls or calls without preset agendas. It will be appreciated that an agent 110, acting upon explicit instruction by a host or participant caller 120, may have its search scope determined by the instructing host or participant caller 120. That is to say, an agent 110 may be explicitly instructed to search, for example, a particular database, or a particular date range, a specific file type or specific file size. In another embodiment, each agent 110 has text, audio, video and/or data connections to the conference bridge, as deemed necessary. In another embodiment, agent 110 participation on the conference bridge 104 is arranged a priori by sending the agent 110 an invitation to attend the conference. The host can allow for each human participant to invite their own agents 110 to the conference call and have them participate, as deemed appropriate by the conference host. In this embodiment, the agent 110 may speak on behalf of a human participant with preprogrammed data or with other data fed to the agent (e.g., Twitter, blog).

It is another aspect of the present disclosure that the agent 110 adapts its conditions, rules or parameters to the content of the conference call. This can be achieved by providing the audio data of a conference call to a speech to text module 274, which translates the audio into text data (i.e., speech recognition). The resulting text data is then analyzed by information management software 258, which extracts certain subject matter from the text data. One having ordinary skill in the area of data mining or artificial intelligence will appreciate the methods by which the conditions, rules or parameters can be augmented or modified in real-time to adapt to the conversation.

It is another aspect of the present disclosure that the agent 110 listens to or records the conference call. In a preferred embodiment, the agent 110 listens to or records only relevant aspects or portions of a conference call. It may sometimes be desirable for particular aspects of a conference call to be recorded or memorialized for historical, auditing or other purposes. It will be appreciated that recorded conference call data may include audio portions and/or text data (having undergone transformation by the speech to text module 274), and that this data may be recorded in the database 262. In a preferred embodiment, automated recording of relevant aspects may be achieved by an agent 110 that is pre-programmed to activate its recording functionality according to a predetermined agenda or other preset timing. In such an embodiment, the agenda may specify amounts of time set aside to discuss particular topics, and as can be appreciated, the agenda may specify the start and end times of portions of an agenda, or the agenda may specify durations of the various portions of an agenda. In yet another embodiment, the agent 110 may be pre-programmed to activate its recording functionality upon detecting certain keywords in the conversation that correlate to aspects of an agenda or that may indicate a transition corresponding to an agenda. In another embodiment, the agent 110 may be pre-programmed to activate its recording functionality when a certain caller 120 enters the conference call or participates in the conference call. In another embodiment, the agent 110 may record an entire conversation, and filter irrelevant or undesirable portions of the conversation. It will be understood by one having skill in the art that any agent's functionality may be selectively activated or deactivated by a host or caller 120 having sufficient permissions to control the agent 110. It will be further understood by one having skill in the art that the recorded aspects of a conference call may also include, for example, text, chat, presentation, whiteboard and other data exchanged during the conference call.

An individual human user or user group can, over time, create and own a growing library of independent, customized agents 110, each of which corresponds to specific sifting and delivery tasks. For example, a first agent is configured to search for a first set of keywords and a second agent is configured to search for a different second set of keywords. Each individual user or user group can optionally train up a plurality of information agents that, over time, are tuned to provide custom information search and delivery behaviors. Owners of agents can publish/share their respective agents along with descriptions of how the agent is programmed. Further, the agents can be rated by users of the system for quality/utility so that new users of the system can easily find and make use of the best agents 110.

Figure 2A:
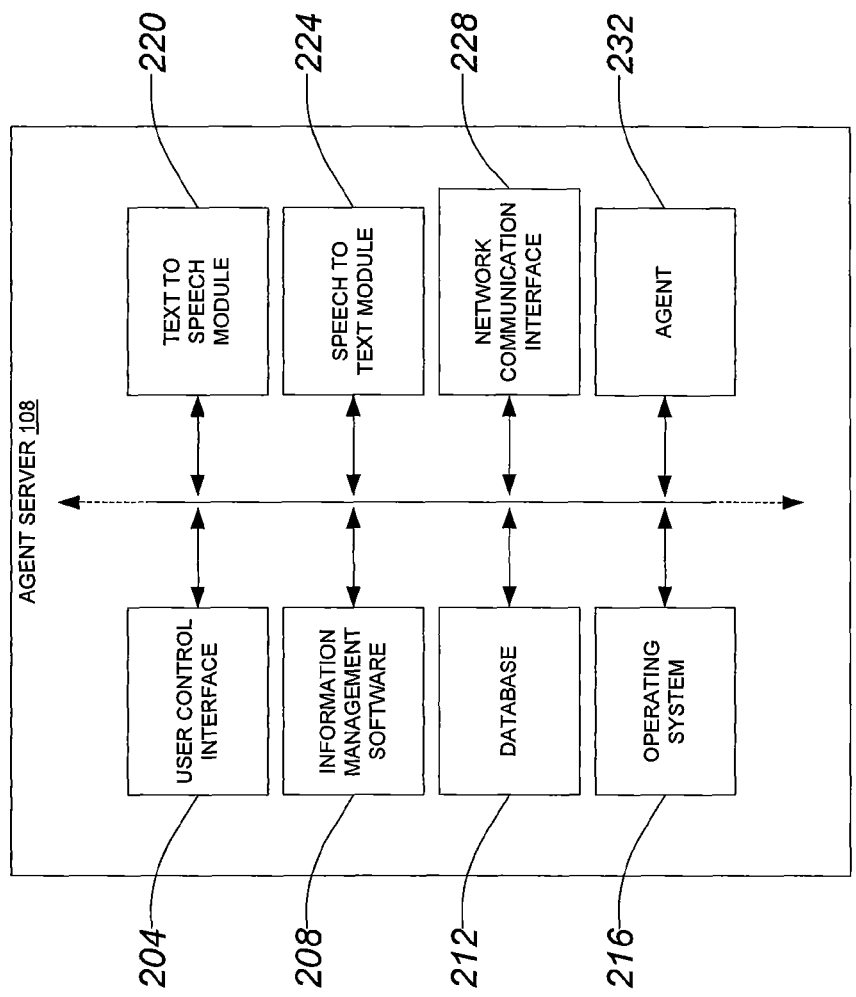
FIGS. 2A and 2B show typical elements that may be present in an agent server and an intelligent agent in one embodiment of the present disclosure.

FIG. 2A shows elements that may be present in an agent server 108 in one embodiment of the present disclosure. The agent server 108 in one embodiment includes a user control interface 204, information management software 208, a database 212, an operating system 216, an optional text to speech module 220, an optional speech to text module 224, a network communication interface 228 and an agent 232. The user control interface 204 is the means by which a user can administer the rules to control the behavior and participation of the agent server 108 and an agent 110.

The information management software 208 is the software that implements the functions of the agent server 108 including, for example, creating or spawning agent 232 processes, communicating with agent 110, communicating with the conference bridge 104, communicating with a host agent 312 (See FIG. 3), collecting and prioritizing information, transmitting information to the conference bridge 104 and managing agent 110 participation in a conference call.

The database 112 is a data storage component used by the agent server 108 for information storage and retrieval. The database 112 contains user customized search settings and results that may be customized for specified information filtering and delivery tasks.

One having ordinary skill in the art will appreciate that the operating system 216 serves as an interface between the hardware and applications (e.g., information management software 208) of the agent server 108.

The text to speech module 220 is a component that transforms text data into human-understandable audible data, and the speech to text module 224 is a component that transforms audible data into text data. It will be appreciated that the text to speech module 220 and the speech to text module 224 may be software executed by the agent server 108, or the modules 220, 224 may be specifically designed hardware components that are in communication with agent server 108.

The network communication interface 228 is a component that provides the physical interface between the agent server 108 and the network 112, and may include, for example, a network interface card, a fiber channel adapter, a radio transmitter, a radio antenna, an infrared device and a modem.

The agent 232 represents a component that may be a hardware device in communication with the agent server 108, a software process within the information management software 208, or an independent software process spawned by the management software 208. One having ordinary skill in the art will appreciate that the software process may be, for example, a thread, a subroutine or an object. The hardware device may be, for example, a component connected to the agent server 108's serial port (RS-232), parallel port (IEEE 1284), industry standard architecture bus (ISA), peripheral component interconnect bus (PCI), universal serial bus (USB), small computer systems interface (SCSI) or IEEE 1394 interface (firewire).

The agent 232 identifies words, phrases, and other symbols in the text stream of the conference call conversation and, when selected words, phrases, and symbols are identified, collects, in substantial real-time, relevant information and provides the collected information to the conference host.

In one configuration, the agent 232 directly or indirectly subscribes to the conference bridge audio via a remotely located speech-to-text word-spotting service. This service, if activated by the host, would listen for keywords in the conference discussion using a speech-to-text engine. The agent 232 subscribes to the service and, as keywords are identified by the service and notified to the agent, the agent modifies the information search criteria adaptively as the discussion is in progress.

Figure 2B:
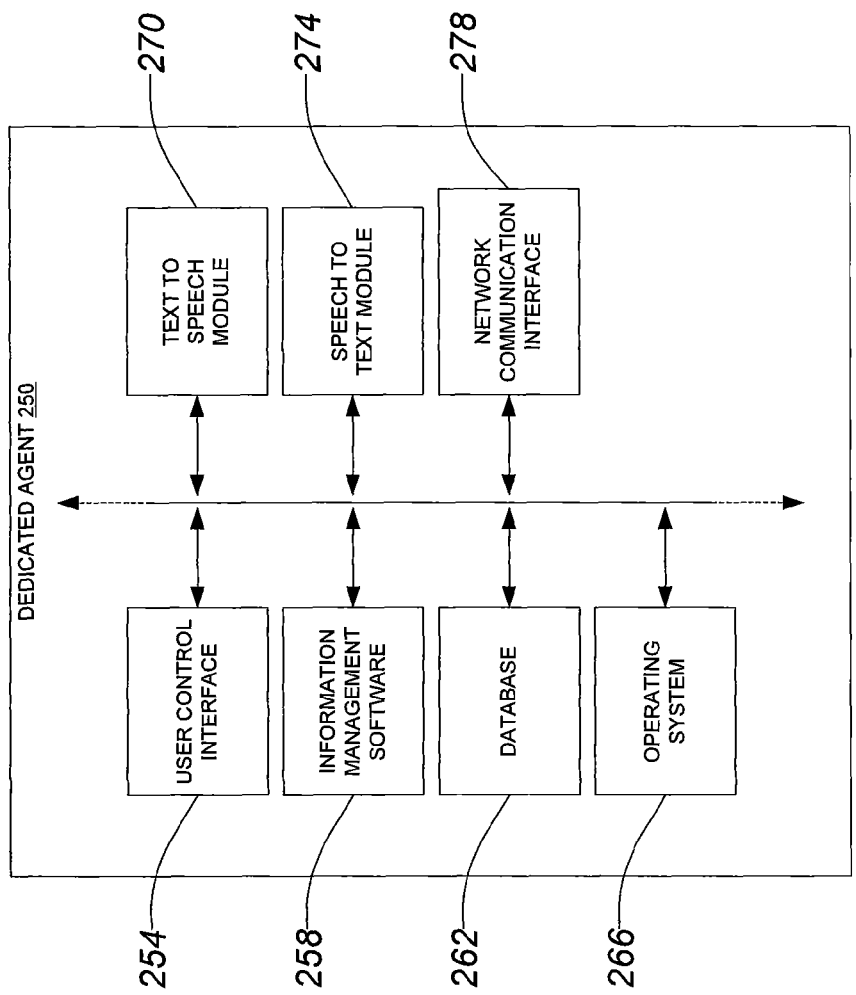

Referring now to FIG. 2B, a dedicated agent 250 is shown having components that may be present in one embodiment of the present disclosure. Similar to the agent server 108 as described above, the dedicated agent 250 has a user control interface 254, information management software 258, a database 262, an operating system 266, an optional text to speech module 270, an optional speech to text module 274 and a network communication interface 278. The user control interface 254 is the means by which a user or other application can administer the rules to control the behavior and participation of the dedicated agent 250. The information management software 258 is the software that implements the functions of the dedicated agent 250. The database 262 is a data storage component used for information storage and retrieval. The operating system 266 serves as an interface between the hardware and applications (e.g., information management software 258) of the dedicated agent 250. The text to speech module 270 is a component that transforms text data into human-understandable audible data. The speech to text module 274 is a component that transforms audible data into text data. The network communication interface 278 is a component that provides the physical interface between the agent server 150 and the network 112, and may include, for example, a network interface card, a fiber channel adapter, a radio transmitter, a radio antenna, an infrared device and a modem. It should be understood that the foregoing descriptions are substantially equivalent to the descriptions of the components of agent server 108. One having skill in the art will appreciate that agent server 108 and dedicated agent 250 may, in one embodiment, be substantially identical components, except the dedicated agent 250 may be subject to the control of agent server 108 (e.g., having a master-slave relationship). In such an embodiment, the dedicated agent 250 is subjugated to the agent server 108 in a similar way as agent 232.

As used herein, the agent 110, the agent 232 and the dedicated agent 250 may have differing implementations, but perform the same essential functions with respect to the present disclosure, and will generally be referred to as agent 110. It will be understood, however, that references to agent 110 are interchangeable with agent 232 and dedicated agent 250.

Figure 3:
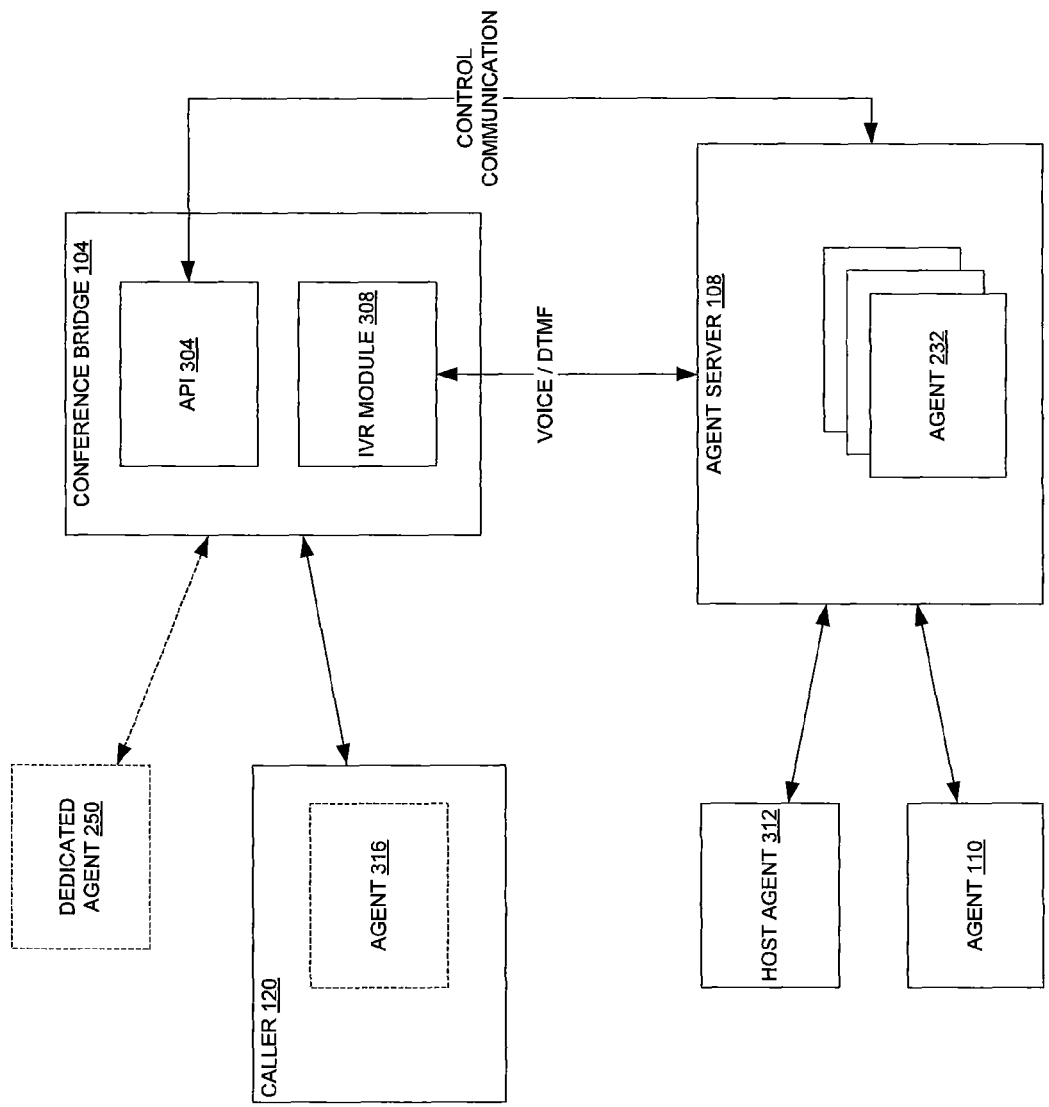
FIG. 3 shows a more detailed relationship between certain elements in one embodiment of the present disclosure.

FIG. 3 shows a block diagram of components in one embodiment of the present disclosure and the communication between the components and specific modules. The conference bridge 104 has an API 304 (application programming interface) and an IVR module 308 (interactive voice response). The API 304 is an interface by which applications or devices can interact with and access functions of the conference bridge 104. The API 304 (e.g., a bridge control API (BCAPI)) may allow a host or administrator of a conference call to perform administrative functions including, for example, creating a new conference, opening and closing a conference, reporting the status or state of a conference, dialing out to a caller/participant, muting/unmuting a caller/participant, locking/unlocking conferences to new caller/participants and promoting or demoting a participant to moderator. The IVR module 308 is the component that enables detection of voice and keypad inputs. The IVR module 308 can respond to a caller or participant with pre-recorded or dynamically generated audio to direct users on how to proceed. The IVR module 308 can be used to control almost any function of the conference bridge 104 where the interface can be broken down into a series of simple menu choices.

The figure shows a host agent 312 in communication with agent server 108. The host agent 312 is identical to an agent 110, but it may be designated as the host or moderator of the agents 110 that are associated with agent server 108. As a moderator, the host agent 312 may be in communication with the user control interface 204 of agent server 108, establishing, modifying and enforcing rules related to how the information from agent 110 is prioritized, and how and when the agent 110 may interact with a conference call. In another embodiment, the host agent 312 may serve to collect information from the agents 110, then make a determination of relevance and priority, enter a conference call and broadcast the information accordingly. The broadcast may be made over the same or a channel different from the channel used for live voice bearing messages and the broadcast may be made over the conference bridge or over an endpoint of a selected participant different from the endpoint being used by the participant for the call. For example, the agent can transmit the information to the participant's personal computer while the participant is talking over a desk phone. In another embodiment, host agent 312 may be a user or caller 120 who is in communication with user control interface 204. In yet another embodiment, a caller 120 that is in communication with conference bridge 104 may use the IVR module 308 to then communicate with the user control interface 204 of the agent server 108 and perform host functions.

The figure shows an agent 316 in caller 120. It is one aspect of the present disclosure that agent 316, being functionally equivalent to agent 110, is personal to the caller 120. Agent 316 may be a process that is programmed or spawned by the caller 120, or it may be a hardware device that interacts solely with the caller 120, by exclusively providing the caller 120 with information. Further, agent 316 may be a device or process that resides or runs exclusively on the caller 120 device or system.

The figure shows a control communication and a voice/DTMF (dual tone multi-frequency) connection between the conference bridge 104 and the agent server 108. The control communication is the method by which the agent server 108 can interact with the API 304 and transmit information to the conference bridge 104. The voice/DTMF connection is the method by which the agent server 108 interacts with the IVR module 308 and broadcasts announcements to a conference call. The voice/DTMF connection is also the method by which the agent server 108 may listen to the content of a conference call and receive DTMF signals.

It is one aspect of the present disclosure that the agent 110 delivers relevant information to the conference call bridge. As described above, agent 110 may be a dedicated agent 250 that communicates directly with conference bridge 104, or agent 110 may be in communication with agent server 108, which may collect, prioritize and ultimately transmit the information to conference bridge 104. Information from agent 110 may include, for example, text, audio, video, images, documents and applications. In one embodiment, this information and associated metadata may be provided to the conference bridge 104 in all possible formats and thereafter the conference bridge 104 transmits the appropriate data/format to each respective caller 120 based on the caller 120's connection, device and preferences.

By way of example, agent 110 may transmit a relevant video to agent server 108 for transmission to the conference bridge 104. Accompanying the video may be the associated audio information. Additionally, the text that was converted from the audio information by the agent's 110 speech to text module 274 may be sent to the conference bridge 104. Alternatively, the conversion to text may have been performed by the agent server 108's speech to text module 224. Additionally, a pointer to the information (e.g., a uniform resource locator (URL) of the video) may be sent along with the video. It may then be a function of the conference bridge 104 to determine how to ideally transmit an appropriate level of information to a caller 120 or a dedicated agent 250 that is participating in the conference. A caller 120 with a connection/device that is only able to receive audio information may only receive the audio track of the video; a caller 120 that is connecting with a computer may be configured to receive the video, the text and the URL; a caller 120 that is connecting with a limited bandwidth PDA may only receive the text and a decimated (e.g., reduced sample, downsampled) version of the video; and a dedicated agent 250 may only receive the URL. Depending on the connection bandwidth, device capabilities, and caller 120 preferences, the information transmitted by the conference bridge 104 will have varying formats and richness.

It is yet another aspect of the present disclosure that the agent 110 transmits information only to certain participants of a conference call. As noted above, metadata may accompany information from agent 110, and this metadata may be used by the conference bridge 104 to filter or determine to which callers 120 to push the information. In another embodiment of the present disclosure, the caller 120 may have a "pull" type relationship where the caller 120 or dedicated agent 250 may retrieve information from the conference bridge 104 only upon selective indication. Alternatively, the caller 120 or dedicated agent 250 may receive notification that information is available for retrieval. It is yet another aspect of the present disclosure that the agent 110 or agent server 108 may notify the conference moderator and/or participants when new information is available, at which time the agent 110 or agent server 108 may receive a request that the information be played or broadcast to the conference. This notification could be, for example, an audio tone or series of tones broadcast to the conference or to the host/participant. Likewise, the request could be an audio tone or series of tones received by the agent 110 and/or agent server 108. In such an embodiment, the caller 120 or dedicated agent may inspect the information metadata (e.g., keywords, title) and determine whether to retrieve the information. In yet another embodiment, the caller 120 may have a hybrid push and pull relationship where certain non-essential information is retrieved only upon selective indication, and other essential or urgent information is pushed and automatically broadcast to a caller 120.

In one embodiment, the agent 110 may use, as a source of data, a previous agent-enabled call. Furthermore, the previous agent-enabled call may be divided into sections or subsets (e.g., agenda, participant list, and decision/outcome). It is therefore another aspect of the present disclosure that a caller 120 may explicitly tag sections of the call for later retrieval. Tagging portions of a call may also be used, for example, to set permissions or levels of access to certain portions of a call. This may include, for example, tagging part of the conversation as public, and therefore accessible and searchable by anyone while other parts tagged as private are only accessible by callers 120 who participated in the call, or by a specific subset of individuals or agents 110.

In another aspect of the present disclosure, the caller 120 may selectively engage agent 110, and instruct the agent to search for certain information. As one having skill in the art will appreciate, a caller 120 may directly interact with an agent 316 residing on the caller's 120 handset or system, residing on agent server 108, or in communication with the agent server 108 and/or conference bridge 104.

Figure 4:
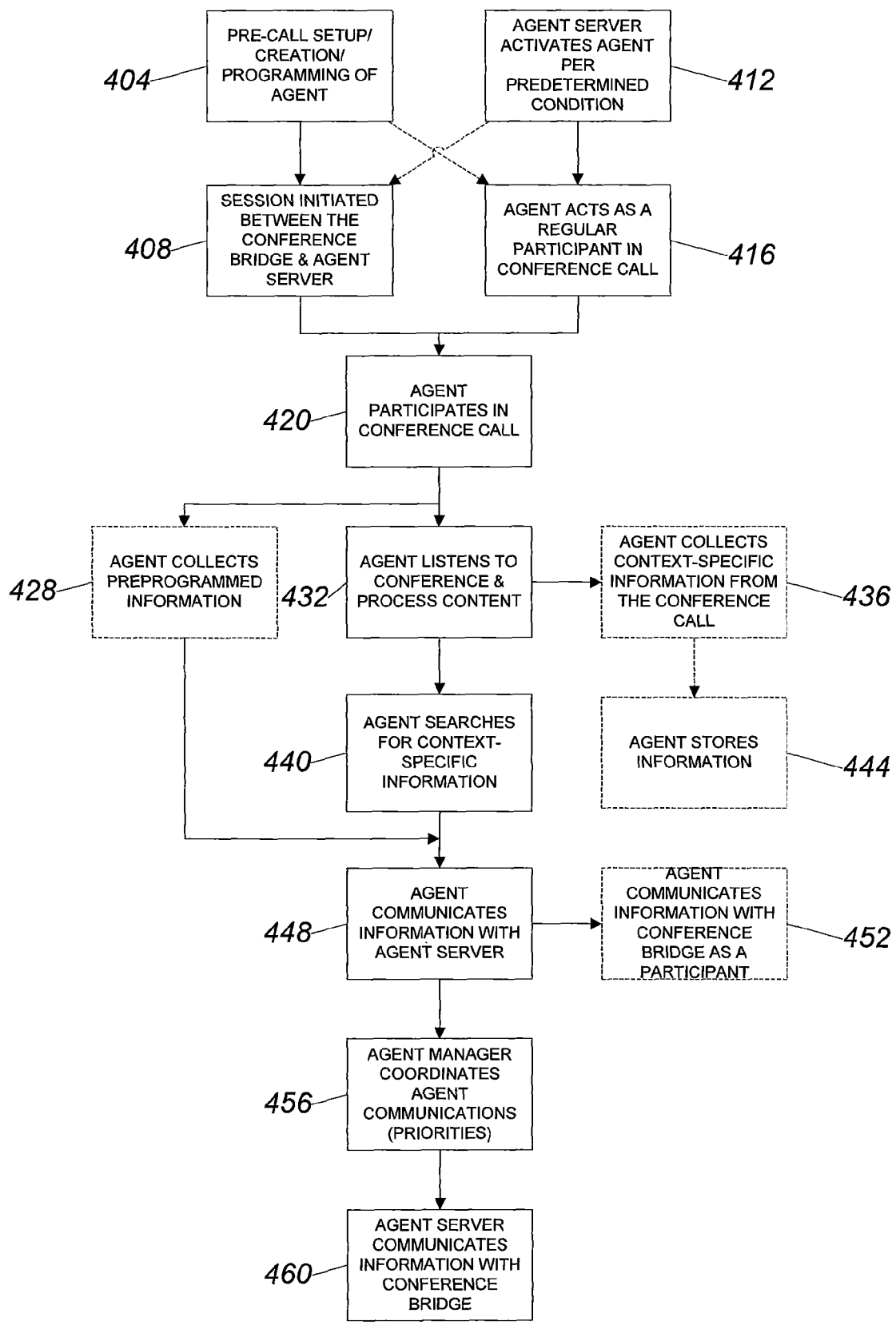
FIG. 4 shows a flow diagram of the process of one aspect of the present disclosure.

FIG. 4 shows a flow diagram of the process of one aspect of the present disclosure. The process begins with either step 404 or 412. In step 404, a user creates an agent 110 by programming its parameters. This may occur on the agent server 108, or on a device (e.g., host agent 312) in communication with the agent server 108. The setup parameters may include, for example, the conference bridge number, the conference code (PIN), the time to call into the conference bridge, a prerecorded message to be relayed during the call, an agenda, search terms, a search string and the data feeds to be used. In step 408, a session is created between the agent server 108 and the conference bridge 104. As one having skill in the art will appreciate, the agent server 108 may initiate the session by calling into the conference bridge 104 according to the parameters specified in 404. Alternatively, the conference bridge 104 may initiate the session with the agent server 108.

The process may alternatively begin in step 412 where an agent server 108 or, for example, a daemon running on the agent server 108 detects certain conditions (e.g., weather emergency, fire, weekly status meeting, 10% drop in stock price) and activates or spawns an agent. It will be appreciated that in an alternative embodiment, the conference bridge 104 may activate or spawn an agent 110 through the control communication channel for example by a conference host or other caller 120 acting through the IVR 308. In step 416, the spawned or activated agent 110 directly participates in the conference call as a regular participant (i.e., having the same access & interaction as a caller 120). As illustrated in the figure, step 416 may follow step 404 in one alternative embodiment, and step 408 may follow step 412 in another alternative embodiment. After the initial steps, in 420 the agent 110 is a participant in the conference call either directly or via the agent server 108.

In another embodiment, the agent 110 or agent server 108 may initially determine in step 412 that a conference call should take place, the agent 110 or agent server 108 may then determine the relevant participants and agents 110 necessary for the call and proceed with setting up or initiating the conference call with the conference bridge 104, programming the agents 110 and sending invitations to necessary participants.

In step 432, the agent 110 listens to the conference call and processes the audible content and other content (e.g., chat session, white board, presentation slides) to develop keywords or search strings. In 440, the agent 110, using the developed keywords, searches for context-specific information from external sources. In an alternative embodiment, in step 428 the agent 110 may search for information using pre-programmed search strings or parameters.

In yet another alternative embodiment, in step 436 the agent 110 may collect portions or segments of particular interest from within the conference call. In step 444, the agent 110 may then store the collected information in a database 212, 262. This embodiment is preferable for historical and/or auditing purposes. It will be appreciated that the foregoing embodiments are not necessarily mutually exclusive, and that certain embodiments may have more than one or all of the described features.

In step 448, the agent 110 communicates information found in the previous step with the agent server 108. Alternatively, in step 452 the agent 110 may communicate information directly with the conference bridge 104. As described above, the information may include text, audio, video, images, documents and applications. In 456, the agent server 108 determines the relevance of the received information and prioritizes the information according to certain rules. The rules used to prioritize information may be call-specific, or may be a broad policy that applies to all conference calls. In step 460, the agent server 108 transmits the prioritized information to the conference bridge 104.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

The disclosure, in various embodiments, include components, methods, processes, systems and/or apparatus substantially as depicted and described herein, including various embodiments, sub-combinations, and subsets thereof. Those having ordinary skill in the art will understand how to make and use the embodiments after understanding the present disclosure.

The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the invention to the form or forms disclosed herein. In the foregoing detailed description for example, various features are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment.

Moreover, though the description has included description of one or more embodiments and certain variations and modifications, other variations and modifications are within the scope of the invention, e.g., as may be within the skill and knowledge of those in the art, after understanding the present disclosure. It is intended to obtain rights that include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method comprising:
a conference bridge connecting a live communication between at least a first participant and a second participant over a network, the live communication including content;
an agent server executing an agent during the live communication;
the agent determining selected information from the live communication;
the agent searching a data source for the selected information, the selected information being relevant to the content of the live communication; and
in response to locating the selected information, the agent providing the selected information to both the first participant and the second participant during the live communication, wherein the conference bridge broadcasts the selected information to the first and second participants during the live communication.

2. The method of claim 1, wherein the live communication is a conference call, wherein the selected information is provided to a conference bridge associated with the live communication, and wherein the data source is in the form of a syndicated feed.

3. The method of claim 1, wherein the agent searching a data source for selected information comprises the substeps:
receiving the content of the live communication;
converting at least a portion of the content of the live communication to a text equivalent;
parsing the text equivalent to locate a set of keywords; and
searching the data source using the keywords to locate the selected information.

4. The method of claim 1, wherein the search parameters are selected by at least one of the first and second participants before the live communication is initiated.

5. The method of claim 4, further comprising: configuring the processor to perform the search, wherein the configuration parameters comprise a plurality of a conference bridge number, a time to call into the conference bridge, a prerecorded message to be relayed during the live communication, the search parameters, and data fees to be used for the data source.

6. The method of claim 1, wherein the first participant is associated with first and second agents, wherein the first agent is configured to locate selected first information using a first set of keywords, wherein the second agent is configured to locate selected second information using a second set of keywords, and wherein the first and second agents are connected simultaneously to the live communication.

7. The method of claim 1, wherein, in the agent providing the located information, the selected information is also provided over a channel different from the channel being used for the bearer messages for the live communication.

8. The method of claim 1, further comprising:
creating a library of customized agents; and
rating the library of customized agents to identify the best agents.

9. The method of claim 1, wherein the data source is from a previously enabled agent call.

10. The method of claim 9, wherein the previous agent enabled call is divided into sections that are tagged for later retrieval, wherein a first section of the agent enabled call is tagged public and searchable by anyone, and wherein a second section of the agent enabled call is tagged as private and only accessible by callers who participated in the agent enabled call.

11. A conferencing system, comprising:
a conference bridge configured to conference together at least first and second participants over a network; and
an agent server in communication with the conference bridge, the agent server operable to execute an agent, wherein the agent is operable to:
call the conference bridge to participate in the conference call;
receive content of the conference call;
determine selected information from the content;
during the conference call, search a data source for the selected information, the selected information being relevant to the content of the conference call, and wherein the data source is from a previously enabled agent call; and
in response to locating the selected information during the search, broadcast the located selected information to at least one of the first and second participants through the conference bridge.

12. The conferencing system of claim 11, wherein the selected information is provided to the conference bridge and wherein the data source is in the form of a syndicated feed from an Internet aggregator.

13. The conferencing system of claim 11, wherein the search operation comprises the sub-operations:
receive the content of the conference call;
convert at least a portion of the content of the conference call to a text equivalent; parse the text equivalent to locate a set of keywords; and
search the data source using the keywords to locate the selected information.

14. The conferencing system of claim 11, wherein the first participant is associated with first and second agents, wherein the first agent is configured to locate selected first information using a first set of keywords, wherein the second agent is configured to locate selected second information using a second set of keywords, and wherein the first and second agents are connected simultaneously to the conference call.

15. The conferencing system of claim 11, wherein the providing operation comprises broadcasting the selected information to communication devices associated with at least one of the first and second participants.

16. The conferencing system of claim 11, wherein the broadcasting operation also comprises transmitting the selected information over a channel different from the channel being used for the bearer messages for the conference call.

17. The conferencing system of claim 11, wherein the agent is configured to perform the search before the conference call and wherein the configuration parameters comprise a plurality of a conference bridge number, a time to call into the conference bridge, a prerecorded message to be relayed during the live communication, the search parameters, and data fees to be used for the data source.

18. A method, comprising:
transmitting, by a conference bridge and over a network, a first audio output stream, from a first participant communication device to a second participant communication device, and a second audio output stream, from the second participant communication device to the first participant communication device;
identifying, by an information agent executed by an agent server, at least a first keyword in at least one of the first and second audio output streams;
searching, by the information agent, a syndicated feed for at least the first keyword to provide selected information; and
broadcasting, while the conference call is connected, the selected information to both the first and second participant communication devices over the conference bridge.

19. The method of claim 18, wherein the selected information is provided by the conference bridge to the at least one of the first and second participant communication devices.

20. The method of claim 18, wherein the selected information is also provided by a channel different from the channels used for communications.

* * * * *

UNITED STATES PATENT AND TRADEMARK OFFICE
CERTIFICATE OF CORRECTION

PATENT NO.          : 8,700,665 B2
APPLICATION NO.     : 12/430741
DATED               : April 15, 2014
INVENTOR(S)         : Derek Beauregard, Vivek Bhatnagar and Roger Toennis It is certified that error appears in the above-identified patent and that said Letters Patent is hereby corrected as shown below:

Title Page: Item 75

For the second listed inventor, please delete "Bhatnager" and insert --Bhatnagar--.

Signed and Sealed this
Twenty-third Day of June, 2015

Michelle K. Lee
*Director of the United States Patent and Trademark Office*